(12) United States Patent
Kucukcakar et al.

(10) Patent No.: US 11,556,685 B1
(45) Date of Patent: Jan. 17, 2023

(54) TIME-BASED POWER ANALYSIS

(71) Applicant: ANSYS, INC., Canonsburg, PA (US)

(72) Inventors: Kayhan Kucukcakar, Los Altos, CA (US); Han Young Koh, Fremont, CA (US)

(73) Assignee: ANSYS, INC., Canonsburg, PA (US)

( * ) Notice: Subject to any disclaimer, the term of this patent is extended or adjusted under 35 U.S.C. 154(b) by 0 days.

(21) Appl. No.: 16/948,280

(22) Filed: Sep. 11, 2020

(51) Int. Cl.
*G06F 30/323* (2020.01)
*G06F 119/06* (2020.01)

(52) U.S. Cl.
CPC ........ *G06F 30/323* (2020.01); *G06F 2119/06* (2020.01)

(58) Field of Classification Search
CPC .... G06F 30/323; G06F 30/31; G06F 30/3308; G06F 30/33; G06F 2119/06
See application file for complete search history.

(56) References Cited

U.S. PATENT DOCUMENTS

2021/0157966 A1* 5/2021 Crowl .................. G06F 30/373

OTHER PUBLICATIONS

Du, Liang, et al. "Feature extraction for load identification using long-term operating waveforms." IEEE Transactions on Smart Grid 6.2 (2014): 819-826. (Year: 2014).*

* cited by examiner

*Primary Examiner* — Jack Chiang
*Assistant Examiner* — Aric Lin
(74) *Attorney, Agent, or Firm* — Womble Bond Dickinson (US) LLP

(57) ABSTRACT

Systems, machine readable media and methods are described for analyzing one or more physical systems using techniques that recognize patterns in underlying data and use the patterns to efficiently compute outputs using the patterns to reduce computations. The physical systems can be simulated with an estimation (e.g., an estimated power versus time waveform) that can be efficiently computed and then the estimation can be analyzed to detect patterns in the data. The detected patterns can each be analyzed with, in one embodiment, higher accuracy than the estimation to provide data that can be combined across multiple instances of each pattern to provide a higher accuracy evaluation of the system with a lower computational overhead.

16 Claims, 6 Drawing Sheets

TIME-BASED POWER ANALYSIS

BACKGROUND

Time based power consumption analysis of an electrical system attempts to estimate how much power is consumed by the electrical system over a period of time. The analysis can seek to simulate typical uses of the system over time to determine power consumption. For example, a designer of a smartphone can seek to estimate how much power is consumed over a period of time, during typical usage patterns of the smartphone. This estimation is often done before the smartphone is manufactured, and this estimation can be done in simulation software, such as software from ANSYS, Inc. of Canonsburg, Pa., rather than in a physical smartphone. One reason to perform this analysis is to understand how long a particular battery will last in the smartphone over a period of time given typical usage patterns of the smartphone. Based on the results of the analysis, a different battery type or size can be selected or integrated circuit design can be modified to consume less power.

Time based power consumption simulations can compute reasonably accurate power consumption profile over a time window specified with a set of specified switching activities of the electrical system, but these time windows are usually too short because it takes too much computational resources to perform power simulations over long time windows; thus traditional approaches are constrained to short time windows that are not realistic and cannot encompass an extended set of usage patterns on the system.

Other types of time based simulations also suffer from similar problems, and thus cannot provide realistic results for an extended period of time. This includes applications involving application level power analysis, transient thermal analysis, and side channel attack analysis.

SUMMARY OF THE DESCRIPTION

According to one disclosed embodiment, a computer implemented method for performing an analysis of a physical system can include the following operations: generating an estimation of a varying parameter (for example a power waveform versus time) that describes an aspect of the physical system; identifying one or more state signatures in the estimation, each of the state signatures representing a state (for example, a steady power consumption state) of the physical system or part of a system; identifying, within each of the state signatures, a set of one or more patterns in the varying parameter; computing, for each pattern in the set of one or more patterns, a pattern output response (for example, a power consumption value) of the varying parameter; and constructing an output response based on a combination of the pattern output responses for the set of one or more patterns. This method can be performed on a parameter that varies over time or frequency or other variables, and pattern recognition methods can be used to identify the patterns. The method can be performed on a data processing system that is configured to perform the operations; for example, a computer program stored in the data processing system, and a machine readable medium in the system can cause the system to perform this method.

According to another disclosed embodiment, a computer implemented method for performing an analysis of a physical system can include the following operations: generating a representation of a power waveform that is an estimation of power consumption by a circuit in an integrated circuit (IC) over a period of time, the estimation based on switching activities in the IC over the period of time; recognizing one or more patterns in the representation of the power waveform, each of the one or more patterns being a unique pattern; computing power consumed for each unique pattern to derive a set of power consumption patterns; and computing power consumed in the IC as a weighted sum of the set of power consumption patterns. In one embodiment, the method can further include the operation of: filtering the power waveform with one or more low pass filters to smooth the power waveform to create a smoothed power waveform. In one embodiment, the method can further include the operation of: quantizing values in the power waveform to discretize power values in the power waveform into quantized bins.

In one embodiment, the method can further include the operations of: identifying a set of one or more steady state portions of the power waveform; and identifying a set of one or more transient portions of the power waveform. The use of low pass filtering and quantization prior to identifying these portions can improve the system's ability to identify these steady state and transient portions. In one embodiment, the method can further include the operation of: determining, within each of the steady state portions, a number of instances of each unique pattern and wherein the power consumed in the IC is computed based on a weighted sum of the number of instances.

In one embodiment, the patterns can be recognized using statistical measures of the varying parameter, such as average value in a time slot containing a set of values and maximum and minimum values within the time slot. Each steady state portion can be divided into predetermined durations for each time slot (for example, each time slot is 10 clock cycles in duration). In one embodiment, the power consumed for each unique pattern is computed with more accuracy than the estimation of the power waveform. For example, in one embodiment, a full time based analysis if performed for each unique pattern. In one embodiment, the power waveform is estimated from a toggle simulation data of populated nets in a netlist and a load capacitance of each of the populated nets.

The aspects and embodiments described herein can include non-transitory machine readable media that can store executable computer program instructions that when executed cause one or more data processing systems to perform the methods described herein when the computer program instructions are executed. The instructions can be stored in non-transitory machine readable media such as in dynamic random access memory (DRAM) which is volatile memory or in nonvolatile memory, such as flash memory or other forms of memory.

The above summary does not include an exhaustive list of all embodiments are aspects in this disclosure. All systems, media, and methods can be practiced from all suitable combinations of the various aspects and embodiments summarized above and also those disclosed in the detailed description below.

BRIEF DESCRIPTION OF THE DRAWINGS

The present invention is illustrated by way of example and not limitation in the figures of the accompanying drawings in which like references indicate similar elements.

DETAILED DESCRIPTION

Various embodiments and aspects will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments.

Reference in the specification to "one embodiment" or "an embodiment" means that a particular feature, structure, or characteristic described in conjunction with the embodiment can be included in at least one embodiment. The appearances of the phrase "in one embodiment" in various places in the specification do not necessarily all refer to the same embodiment. The processes depicted in the figures that follow are performed by processing logic that comprises hardware (e.g. circuitry, dedicated logic, etc.), software, or a combination of both. Although the processes are described below in terms of some sequential operations, it should be appreciated that some of the operations described may be performed in a different order. Moreover, some operations may be performed in parallel rather than sequentially.

Figure 1:
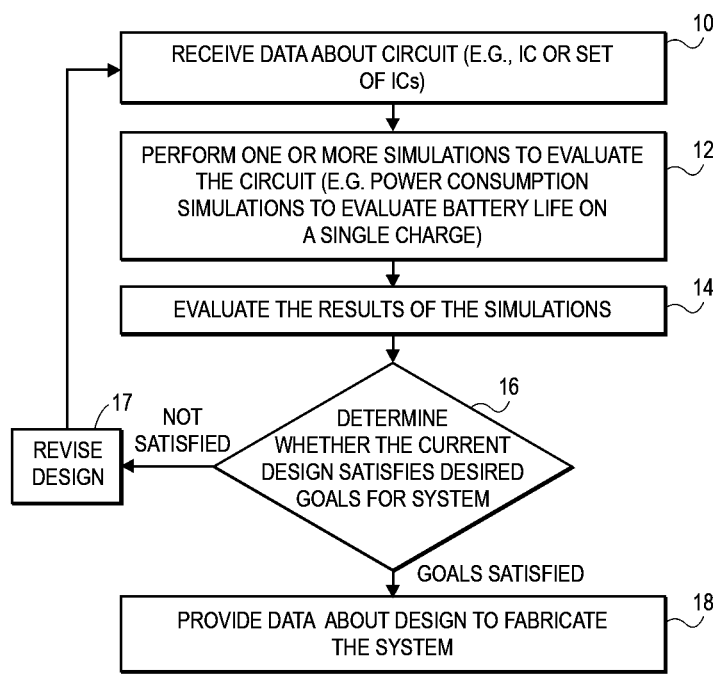
FIG. 1 is a flowchart which illustrates a method which can be used according to one or more embodiments described herein to design and fabricate a physical object such as a smartphone.

The embodiments in this description include methods, data processing systems and machine readable media that can be used to analyze a varying parameter to derive information from the varying parameter. The varying parameter can vary based upon another parameter such as time or frequency or other parameters; for example, the varying parameter can be current or power consumed by an electrical system, and the amount of power consumed can vary over time. The varying parameter can be used to analyze or describe a physical system such as an electrical system containing one or more integrated circuits (ICs) in a smartphone or a car, etc. The analysis of the varying parameter can be used when the physical system is being designed, such as when it is designed using simulation tools or computer aided design (CAD) tools or computer aided engineering (CAE) tools. These tools can be software programs that can simulate physical systems using models or laws of physics to predict the behavior of the physical systems given inputs about the systems. FIG. 1 shows an example of a method that can use such simulation tools to design a physical system, such as a smartphone or an electrical system in a car, etc.

In the method shown in FIG. 1, a simulation tool can be used by a designer of an integrated circuit (IC), or set of ICs, to test or evaluate the design of the IC. The method can begin in operation 10 in FIG. 1 when a data processing system receives data about the design; this can occur after the designer has created, through a CAD process, netlists that describe the IC or ICs and has assembled other input data such as switching activities and cell library data that describe the circuitry within the IC or ICs. Using the input data from operation 10, a data processing system can perform, in operation 12, one or more simulations to evaluate the circuit. For example, the one or more simulations can evaluate power consumption of the circuit to evaluate the amount of power consumed over time to determine whether or not a particular battery will last a sufficient amount of time (e.g., a desired goal of 10 hours) on a single charge of the battery. The simulations can provide sufficient power consumption data to evaluate battery life in operation 14. Then in operation 16, the designer can determine whether or not the current design satisfies desired goals for the system. For example, if the battery life is less than two hours, the system may not satisfy current design goals, requiring the designer to revise the design in operation 17 and return back to operation 10 to reevaluate the new design. On the other hand, if the goals are satisfied, the designer, in operation 18, can provide data about the design to a manufacturing facility to fabricate the design in one or more integrated circuits. The embodiments described herein can be used in the context of the method shown in FIG. 1 to design and evaluate physical systems before they are fabricated.

Figure 2A:
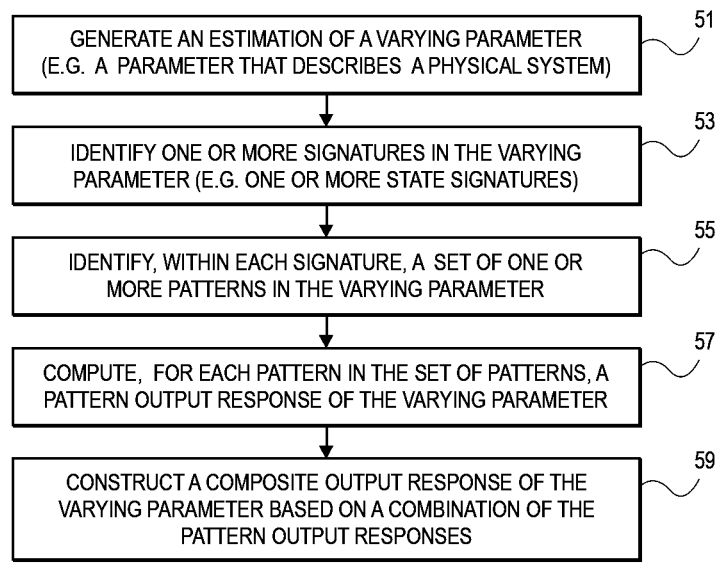
FIG. 2A is a flowchart that shows a method according to one embodiment for analyzing a varying parameter that describes a physical system.
Figure 2B:
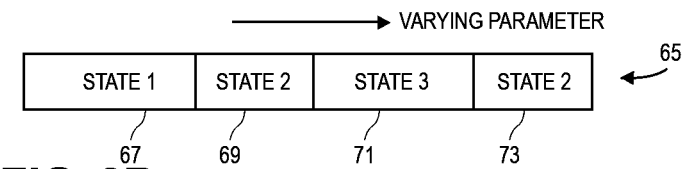
FIG. 2B shows an example of different states in the varying parameter that can be revealed by the method depicted in FIG. 2A.
Figure 2C:
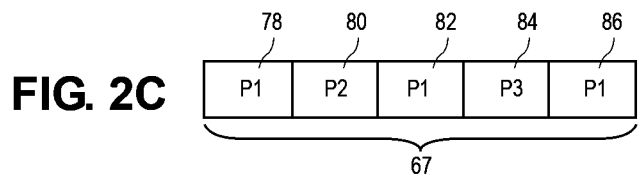
FIG. 2C shows an example of a set of patterns recognized within one of the states shown in FIG. 2B.
Figure 2D:
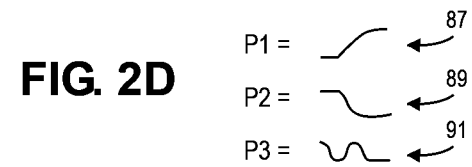
FIG. 2D shows an example of each of the patterns in the set of patterns shown in FIG. 2C.

FIG. 2A shows a general method according to one embodiment which can be used to evaluate or analyze a physical system. This method can be used to evaluate a physical system that is described by a varying parameter, such as a parameter that varies in time or by frequency or by other variables. Specific examples are given below of such varying parameters. In operation 51, a data processing system can generate an estimation of the varying parameter. The estimation can be an approximation of the varying parameter that varies based upon a variable such as time or frequency, etc. The varying parameter can be depicted in a waveform, and the waveform can be represented by a curve on a graph that shows a relationship between the varying parameter and the other variable such as time or frequency. The estimation of the varying parameter can be provided by techniques known in the art for achieving estimated values of the varying parameter; the estimation will normally be less accurate than computations performed later for each identified pattern as explained below. Then in operation 53, the data processing system can identify one or more signatures in the varying parameter. These signatures may be referred to as state signatures in one embodiment, and can represent a state of the physical system, such as a steady state or a transient state. A steady state can represent a state in which the varying parameter is relatively constant while a transient state can represent state in which the varying parameter changes rapidly or significantly over a portion of the waveform. FIG. 2B shows an example of different states or state signatures of the varying parameter. The estimation 65 (of the varying parameter) shown in FIG. 2B includes three different states which are identified in operation 53. In particular, operation 53 identifies states 67, 69, 71, and 73, where states 69 and 73 are identified as the same state in different locations of the estimation 65 of the varying parameter. For example, in the case of a varying parameter which varies in time, state 69 can occur in time before state 73 in the estimation 65. Referring back to FIG. 2A, in operation 55, the data processing system identifies, within each state signature, a set of one or more patterns in the varying parameter. FIG. 2C shows an example after the data processing system has identified three different patterns that occur in state 67 of the estimation 65 of the varying parameter. In particular, operation 55 has identified, within state 67, patterns 78, 80, 82, 84, and 86, wherein pattern 78, 82, and 86 are the same pattern while patterns 80 and 84 are different. FIG. 2D shows an example of three different patterns 87, 89, and 91 which can represent the patterns shown in FIG. 2C. In the example shown in FIG. 2D, the varying parameter may be current or power which varies over time or may be another varying parameter which varies based upon another variable.

The estimation performed in operation 51 can be performed at a more abstract level than lower level models of a physical system in order to achieve speed (of computations) at the expense of accuracy for the estimation while data for more accurate analysis is retained for use in subsequent operations, such as operation 57. In one embodiment, operation 57 can utilize full accuracy analysis within each pattern to compute a pattern output response of the varying parameter within each pattern. This computation or analysis can be performed only once for each unique pattern within a state and then a composite output response, in operation 59, can be constructed as a combination of the pattern output responses computed in operation 57. Thus, rather than computing output responses over the entire sequence of varying parameter data, the pattern output response can be computed only once for a smaller set of similar patterns, and then a composite output response can be constructed based upon, for example, a weighted sum of the combination of pattern output responses as shown in operation 59.

Figure 3A:
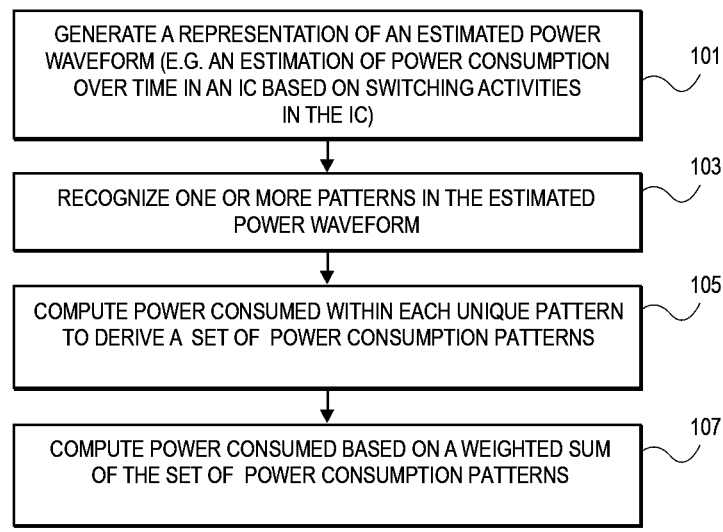
FIG. 3A is a flowchart that illustrates a method according to one embodiment for analyzing a varying power parameter in an electrical system.

FIG. 3A shows another example of a method according to another embodiment. This embodiment uses the method shown in FIG. 3A on a varying parameter that is power consumption over time by an electrical system, such as a smart phone or a single integrated circuit or other electrical system. Thus, the varying parameter is power consumption which varies over time based upon a usage pattern of the electrical system; the usage pattern may be defined at both high and low levels including, for example, usage patterns defined based on application programs (e.g., web browser, GPS map/navigation, streaming video display, etc.) which are executed on the smart phone (high level definition) and switching activities (low level definition) of the circuitry within the smart phone based upon those usage patterns. These usage patterns can define which portions and which components of the smart phone are activated and which portions and which components are off or sleeping during each usage pattern. The usage pattern can include a series over time of uses, such as a phone call followed by web browsing, followed by navigation operations (e.g., GPS receiver operating), followed by video game playing, etc. In operation 101, a data processing system can generate an estimation of a power waveform of the system. This estimation can be performed using PowerArtist from ANSYS of Canonsburg, Pa. This estimation can use the methods and systems described in U.S. patent application Ser. No. 16/058,381, filed Aug. 8, 2018, and entitled GENERATING A POWER PROFILE BY NODE SAMPLING AN IP BLOCK, which claims priority to US provisional patent application No. 62/543,430, filed Aug. 10, 2017 and entitled GENERATING A POWER PROFILE BY NODE SAMPLING AN IP BLOCK. The power waveform can be estimated from toggle simulation data of populated nets in a netlist and from load capacitance data of each of the populated nets. For example, one method for estimating a power waveform can identify a total number (NT) of net weights in a netlist, where each weight is proportional to an effective load capacitance of an associated net. The netlist can be an actual netlist of the design or an estimated netlist of the design before an actual netlist is created. Existing RTL estimation techniques can be used to estimate a netlist. The method can further identify a total number of populated nets (NP) in the netlist, where the NP populated nets are each associated with a net having associated toggle simulation data, such that there are a set of empty nets (NE) with no associate toggle simulation data. Each of the NP nets is associated with one of the weights. A ratio (KS) equal to the sum of all NT net weights divided by a sum of all NP populated weights is generated. Based on the associated toggle simulation data of each of the NP populated nets and further based on the net weights associated with each of the NP populated nets, a sample energy (ES) is generated, and a block power profile based on the estimated block energy (EN) equal to KS multiplied by ES is computed. Further information about this estimation is provided in the two prior applications noted above, both of which are incorporated herein by reference. In other embodiments, alternative techniques for estimating a power waveform can be used.

Figure 3B:
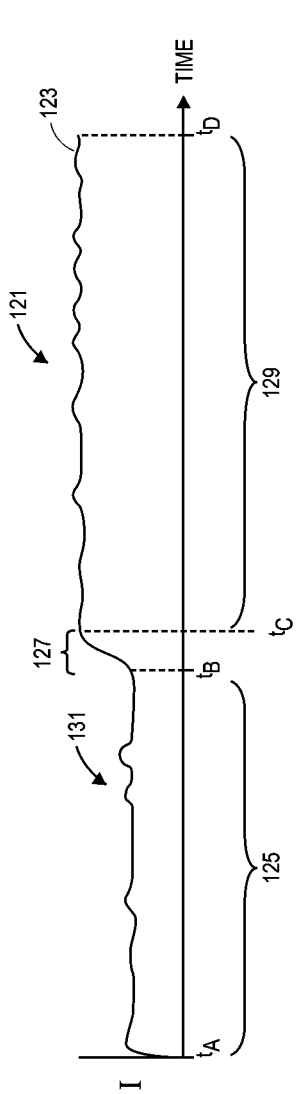
FIG. 3B shows an example of an estimated power waveform that can be derived in an operation in the method shown in FIG. 3A.

FIG. 3B shows an example of an estimated power waveform 123 in the graph 121 of power consumption over time of a simulated system. This estimated power waveform can be generated using operation 101 in FIG. 3A. The estimated power waveform 123 in this example has been processed through a low pass filter to remove high frequency components (such as intermittent, very short duration, spikes in power consumption) from the estimated power waveform. Further, in certain embodiments, values in the estimated power waveform, such as estimated power waveform 123, can be quantized into a limited number of bins (e.g., the analog power values in the estimated power waveform can be quantized into 10 bins of values so that the quantized results have only 10 possible power values instead of potentially an infinite number of possible power values). The use of low pass filtering and quantization techniques will be described further below.

Figure 3C:
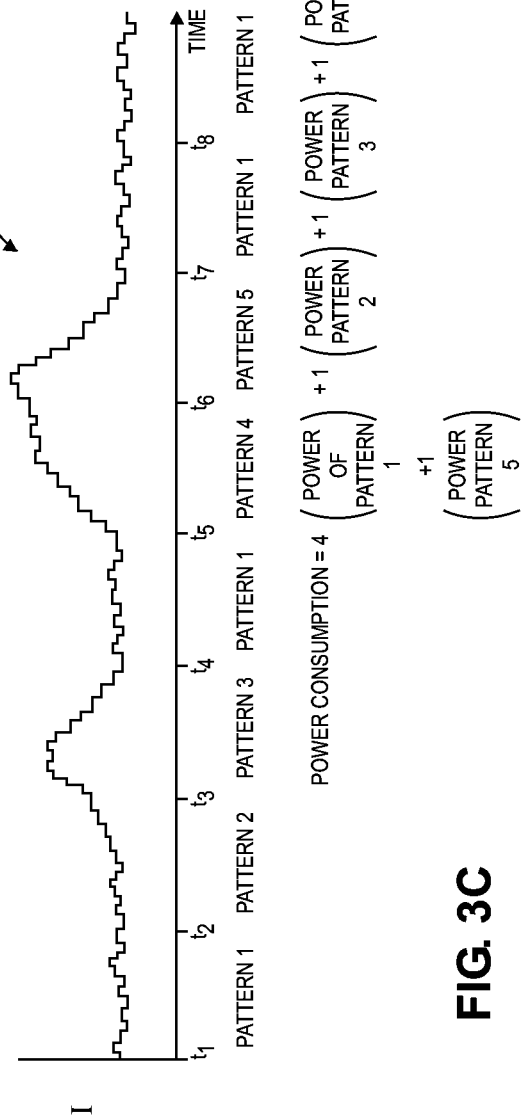
FIG. 3C shows an example of recognized patterns within a portion of the estimated power waveform shown in FIG. 3A.

Referring back to FIG. 3A, in operation 103 the data processing system can recognize one or more patterns in the estimated power waveform. In one embodiment, the estimated power waveform is divided into equal predetermined segments or time slots (e.g., each segment or time slot having a duration of 10 milliseconds or 10 clock cycles, etc.), and the data processing system analyzes each segment or time slot relative to the other segments or time slots to determine whether one segment has a pattern that matches a pattern from another segment or time slot. Various different possible pattern matching methods can be used in operation 103 to identify patterns within the estimated power waveform. Further information about possible pattern matching methods is provided below. In one embodiment, operation 103 may be preceded by a pattern recognition operation that recognizes different states in the estimated power waveform (e.g., one or more steady states and one or more transient states) and the pattern matching of operation 103 can be performed within each of these states to recognize patterns within each state (as opposed to across all different states). FIG. 3C shows an example of a result of a pattern matching operation performed within portion 131 of the estimated power waveform 123 shown in FIG. 3A. In the example shown in FIG. 3C, five different patterns are recognized within the portion 131 based upon the power consumption values within each segment or timeslot, such as the time slot between times t2 and t3 shown in FIG. 3C. Further information regarding FIG. 3C will be provided below in conjunction with the discussion of FIG. 4.

Referring back to FIG. 3A, in operation 105, the data processing system computes the power consumed within each unique pattern (e.g., pattern 3 between times t3 and t4 in FIG. 3C) to derive a set of pattern based power consumption values. In other words, the data processing system in operation 105, will compute power consumption based on each unique pattern to provide a power consumption value for that pattern which can be combined with power consumption values from other patterns based upon a weighted sum across all of the patterns that have been recognized in the estimated power consumption waveform. In operation 107, the data processing system can compute the power consumed based upon the weighted sum of the set of pattern based power consumption values. An example of such computation, using a weighted sum, for the total power consumption within a set of patterns is shown in FIG. 3C. In this example in FIG. 3C, the power consumption over the eight patterns in FIG. 3C is: 4×(power of pattern 1)+1× (power of pattern 2)+1×(power of pattern 3)+1×(power of pattern 4)+1×(power of pattern 5). In this case the number of instances of each unique pattern determines the weight used in the weighted sum of the power consumption. This weighted sum is calculated over the entire duration of the state 125, so there will likely be many more instances of pattern 1 and some more instances of pattern 3 and possibly other patterns such as patterns 4 and 5.

Figure 4:
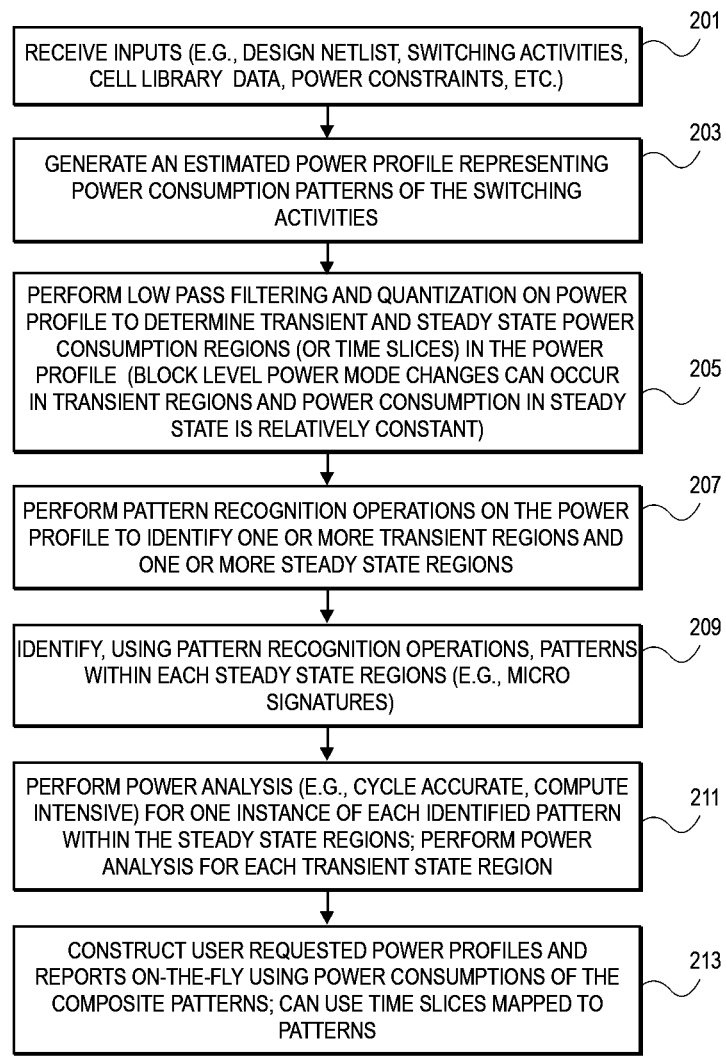
FIG. 4 is a flowchart that shows another method according to one embodiment for analyzing a varying power parameter in an electrical system.

FIG. 4 shows a more specific method according to one embodiment which can be used to compute power consumption values very quickly "on the fly" based upon user requested power profiles for different usage patterns and based upon the recognized patterns in an estimated power waveform. In operation 201, the data processing system can receive a conventional set of inputs about the electrical design, and this set of inputs can include a design netlist, switching activities of nets in the netlist, cell library data about the cells in the design, power constraints, etc. These inputs can be the typical inputs that are received by PowerArtist from ANSYS Inc. of Canonsburg, Pa. These inputs can be used to generate, in operation 203, an estimated power profile such as an estimated power waveform which represents power consumption patterns based upon the inputs. Operation 203 in one embodiment can be similar to operation 101 shown in FIG. 3A and can use similar methods or techniques described relative to operation 101 in FIG. 3A to generate an estimated power waveform. In one embodiment, PowerArtist can be used to generate this estimated power waveform. Then in operation 205, the data processing system can perform low pass filtering and quantization on the power profile, such as an estimated power waveform, to generate a waveform from which transient and steady-state power consumption regions or states in the power profile can be determined.

The low pass filtering and the quantization, in operation 205, can improve the ability of the data processing system to determine transient and steady-state power consumption regions or states in the power profile and also improve the ability of the data processing system to perform pattern recognition with each of the states in operation 207. The low pass filtering can use conventional low pass filtering techniques to remove intermittent and short duration power spikes so that the remainder of the process can ignore these power spikes. The quantization methods can quantize the power consumption values which can be originally in analog form, into discretized or quantized bins to reduce the number of potential power consumption values; in one embodiment, the number of quantization bins can be 10 bins.

In one embodiment, pattern recognition methods can be used, in operation 207, to identify the transient and steady-state power consumption regions or states in the power profile after the estimated power consumption waveform has been generated and low pass filtered and quantized. These different states can be the result of block level power mode changes that can occur in the transient regions, such as when a module that has been asleep (e.g., a module such as the GPS receiver) becomes active and hence transitions from using almost no power to using nearly full power for that portion of the system. An example of a transient region or state is shown as transient state 127 in FIG. 3B. Steady-state portions, such as those shown in steady state region 125 and 129 shown in FIG. 3B, can represent relatively constant power consumption values that occur when such block level changes do not occur; for example, the usage pattern remains the same and no new applications are launched by the user or by the system. The identification of the different states can use techniques described herein to recognize the patterns of each of the states. Alternatively, the input data may indicate when the transient states occur if they are caused by changes in applications (or other changes specified in the input data, such as the input data received in operation 201). Once the different states (such as transient and steady states) are identified in operation 207, the data processing system can perform operation 209. In operation 209, the data processing system can identify patterns within each state. In one embodiment, this recognition can occur within each steady state region, while pattern recognition within each transient region may not be used. The patterns can be referred to as micro-signatures, and each pattern can be identified using pattern recognition techniques know in the art. The result of operation 209 can produce an identified set of patterns, such as the five patterns shown in FIG. 3, which depicts the result of identifying patterns in time slots within the portion 131 of the estimated power waveform 123 shown in FIG. 3B.

In one embodiment, the pattern recognition in operation 209 can use an approach that compares statistical values, such as average, maximum and minimum values, within each time slot to determine whether two time slots have the same pattern. Generally, under this approach, two patterns are identified as the same pattern when all 3 values (average, maximum, and minimum) are the same or within a threshold value of each other. In this embodiment, the power values are quantized and low pass filtered so that the extreme values from very short duration power spikes are removed and the number of possible power values is constrained by the number of quantization bins (e.g., 10 bins for 10 different possible power values). The power values within each time slot (e.g., 10 clock cycles in the design) are used to compute the average power value with each time slot and to determine the minimum power value and maximum power value within each time slot. The average value within each time slot can be compared using a threshold; if the two values from 2 time slots are exactly the same (no difference exists between the quantized value) or their difference is within a threshold value (e.g., threshold value=1%), then a first test of 3 tests is satisfied. In one embodiment, the comparison of the average value can go further, when their quantized average values match, by comparing the actual, unquantized average values to determine whether their difference is within a threshold value (such as quantization level of values or other values). If the average values match, then the method compares their maximum values; these values are deemed to match, in one embodiment, when the difference between these maximum values is less than or equal to 2 (in quantized unit values). The minimum values between the two time slots are also compared, and these values are deemed to match when the difference between these minimum values is less than or equal to 3 (in quantized unit values). In this embodiment, the patterns are deemed to match when all 3 tests (average value comparison, maximum value comparison, and minimum value comparison) report a match. The approach can be used across all patterns within each steady state. In another embodiment, a number of peaks and troughs in the waveform can be compared to be same or within a threshold. It will be appreciated that alternative matching tests and alternative thresholds can be used in alternative embodiments. The result of operation 209 provides an identified list of matching patterns, such as the matching patterns shown in FIG. 3C.

FIG. 3C shows an example of a result of a pattern matching operation performed within portion 131 of the estimated power waveform 123 shown in FIG. 3A. In the example shown in FIG. 3C, five different patterns are recognized within the portion 131 based upon the power consumption values within each segment or timeslot, such as the time slot between times t2 and t3 shown in FIG. 3C. Patterns between time periods t1-t2, t4-t5, t7-t8 and t8-t9 are identified as the same while all other time slots have unique patterns. In this example, the power consumption computation in operation 211 for pattern 1 can be performed only once for this pattern (rather than 4 times in the prior art) and used in the weighted sum shown in FIG. 3C that produces a composite result based on the weighted sum. The number of instances of each unique pattern determines the weight for that pattern in the weighted sum; for example, if there are a total of 5 patterns for a unique pattern then the weight is 5.

Referring back to FIG. 4, in operation 211 the power analysis can use an accurate, time based computationally intensive approach to compute power consumption for only one instance of each unique pattern using the input data (e.g., switching activities, etc.) for one of the instances of the pattern. Also in operation 211 the power analysis can use a full time based accurate, computationally intensive approach to compute power during each transient region or state using the input data for each such transient state. In one embodiment, patterns in the transient regions may be recognized and used to compute power consumption for each representative pattern recognized in the transient regions; in an alternative embodiment, power consumption within each transient region may be computed separately without using recognized patterns across the transient regions. The power analysis computations in operation 211 are configured, in one embodiment, to be more accurate than the estimation created in operation 203. The input data received in operation 201 is still available at this point and can be fully utilized in one embodiment to provide a high accuracy solution even though the starting point in operation 203 was an estimated power waveform that was computed with less accuracy than the computations in operation 211. After operation 211, the data processing system can provide an output, in operation 213, of the total power consumption of the system under design. Further, in operation 213, the data processing system can provide and construct user requested power profiles based on the analyzed power of each instance of the identified patterns. Moreover, a user can use the mappings in time slots to compute power parameters at specific instances in time. The user can also create on the fly reports based on these identified patterns and their mappings to points in time along the power waveform.

The subject matter described herein provides many technical advantages. As described herein, the computer-based techniques of the present disclosure improve the functioning of a computer system as compared to conventional approaches because the techniques described herein enable power profile generation and power modeling of electronic circuit designs in a manner that is more accurate and/or more efficient (e.g., faster, with smaller memory and processing requirements) as versus the conventional approaches. Full time based power analysis can still be performed within identified patterns, but if the embodiment generates enough matched patterns, then the overall processing can be less than conventional approaches. The computer-based techniques achieve such improvements while alleviating the need for expensive and time consuming electronic circuit simulations and event propagation. This is enabled by employing pattern matching and other techniques described herein.

Figure 5:
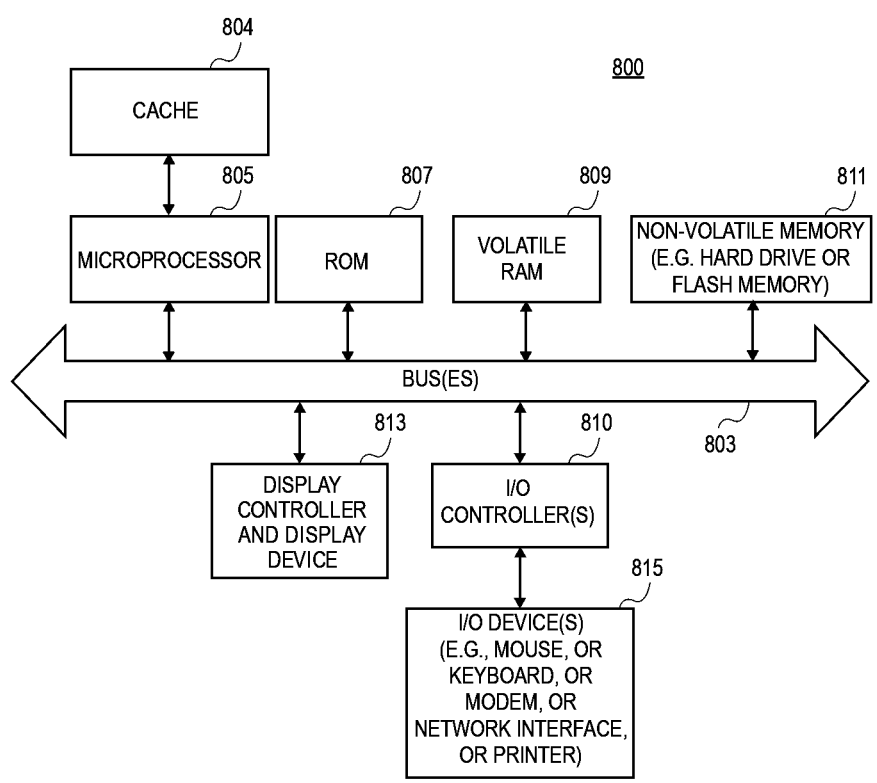
FIG. 5 shows an example of a data processing system that can be used to perform any of the methods described herein to analyze a varying parameter.

FIG. 5 shows one example of a data processing system 800, which may be used with one embodiment. For example, the system 800 may be implemented to provide a system or device that performs the method of FIG. 1 or 2A or 3A or 4. Note that while FIG. 5 illustrates various components of a device, it is not intended to represent any particular architecture or manner of interconnecting the components as such details are not germane to the disclosure. It will also be appreciated that network computers and other data processing systems or other consumer electronic devices, which have fewer components or perhaps more components, may also be used with embodiments of the disclosure.

As shown in FIG. 5, the device 800, which is a form of a data processing system, includes a bus 803 which is coupled to a microprocessor(s) 805 and a ROM (Read Only Memory) 807 and volatile RAM 809 and a non-volatile memory 811. The microprocessor(s) 805 may retrieve the instructions from the memories 807, 809, 811 and execute the instructions to perform operations described above. The microprocessor(s) 805 may contain one or more processing cores. The bus 803 interconnects these various components together and also interconnects these components 805, 807, 809, and 811 to a display controller and display device 813 and to peripheral devices such as input/output (I/O) devices 815 which may be touchscreens, mice, keyboards, modems, network interfaces, printers and other devices which are well known in the art. Typically, the input/output devices 815 are coupled to the system through input/output controllers 810. The volatile RAM (Random Access Memory) 809 is typically implemented as dynamic RAM (DRAM), which requires power continually in order to refresh or maintain the data in the memory.

The non-volatile memory 811 is typically a magnetic hard drive or a magnetic optical drive or an optical drive or a DVD RAM or a flash memory or other types of memory systems, which maintain data (e.g., large amounts of data) even after power is removed from the system. Typically, the non-volatile memory 811 will also be a random access memory although this is not required. While FIG. 5 shows that the non-volatile memory 811 is a local device coupled directly to the rest of the components in the data processing system, it will be appreciated that embodiments of the disclosure may utilize a non-volatile memory which is remote from the system, such as a network storage device which is coupled to the data processing system through a network interface such as a modem, an Ethernet interface or a wireless network. The bus 803 may include one or more buses connected to each other through various bridges, controllers and/or adapters as is well known in the art.

Portions of what was described above may be implemented with logic circuitry such as a dedicated logic circuit or with a microcontroller or other form of processing core that executes program code instructions. Thus processes taught by the discussion above may be performed with program code such as machine-executable instructions that cause a machine that executes these instructions to perform certain functions. In this context, a "machine" may be a machine that converts intermediate form (or "abstract") instructions into processor specific instructions (e.g., an abstract execution environment such as a "virtual machine" (e.g., a Java Virtual Machine), an interpreter, a Common Language Runtime, a high-level language virtual machine, etc.), and/or electronic circuitry disposed on a semiconductor chip (e.g., "logic circuitry" implemented with transistors) designed to execute instructions such as a general-purpose processor and/or a special-purpose processor. Processes taught by the discussion above may also be performed by (in the alternative to a machine or in combination with a machine) electronic circuitry designed to perform the processes (or a portion thereof) without the execution of program code.

The disclosure also relates to an apparatus for performing the operations described herein. This apparatus may be specially constructed for the required purpose, or it may comprise a general-purpose device selectively activated or reconfigured by a computer program stored in the device. Such a computer program may be stored in a non-transitory computer readable storage medium, such as, but not limited to, any type of disk including floppy disks, optical disks, CD-ROMs, and magnetic-optical disks, DRAM (volatile), flash memory, read-only memories (ROMs), RAMs, EPROMs, EEPROMs, magnetic or optical cards, or any type of media suitable for storing electronic instructions, and each coupled to a device bus.

A machine readable medium includes any mechanism for storing information in a form readable by a machine (e.g., a computer). For example, a non-transitory machine readable medium includes read only memory ("ROM"); random access memory ("RAM"); magnetic disk storage media; optical storage media; flash memory devices; etc.

An article of manufacture may be used to store program code. An article of manufacture that stores program code may be embodied as, but is not limited to, one or more non-transitory memories (e.g., one or more flash memories, random access memories (static, dynamic or other)), optical disks, CD-ROMs, DVD ROMs, EPROMs, EEPROMs, magnetic or optical cards or other type of machine-readable media suitable for storing electronic instructions. Program code may also be downloaded from a remote computer (e.g., a server) to a requesting computer (e.g., a client) by way of data signals embodied in a propagation medium (e.g., via a communication link (e.g., a network connection)) and then stored in non-transitory memory (e.g., DRAM or flash memory or both) in the client computer.

The preceding detailed descriptions are presented in terms of algorithms and symbolic representations of operations on data bits within a device memory. These algorithmic descriptions and representations are the tools used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be kept in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "receiving," "determining," "sending," "terminating," "waiting," "changing," or the like, refer to the action and processes of a device, or similar electronic computing device, that manipulates and transforms data represented as physical (electronic) quantities within the device's registers and memories into other data similarly represented as physical quantities within the device memories or registers or other such information storage, transmission or display devices.

The processes and displays presented herein are not inherently related to any particular device or other apparatus. Various general-purpose systems may be used with programs in accordance with the teachings herein, or it may prove convenient to construct a more specialized apparatus to perform the operations described. The required structure for a variety of these systems will be evident from the description below. In addition, the disclosure is not described with reference to any particular programming language. It will be appreciated that a variety of programming languages may be used to implement the teachings of the disclosure as described herein.

In the foregoing specification, specific exemplary embodiments have been described. It will be evident that various modifications may be made to those embodiments without departing from the broader spirit and scope set forth in the following claims. The specification and drawings are, accordingly, to be regarded in an illustrative sense rather than a restrictive sense.

What is claimed is:

1. A non-transitory machine readable medium storing executable instructions which when executed by a data processing system cause the data processing system to perform a method for performing an analysis of a circuit, the method comprising:

generating a representation of a power waveform that is an estimation of power consumption by a design of an integrated circuit (IC) over a period of time, the estimation based on switching activities in the design of the IC over the period of time;

recognizing one or more patterns in the representation of the power waveform, each of the one or more patterns being a unique pattern;

computing power consumed for each unique pattern to derive a set of pattern based power consumptions;

computing power consumed in the design of the IC based on a weighted sum of the set of pattern based power consumptions;

receiving a revised design of the IC to reduce power consumption in response to the computed power consumed exceeding a desired goal;

providing data about the revised design of the IC to a manufacturing facility to fabricate the IC.

2. The non-transitory machine readable medium as in claim 1, wherein the method further comprises: filtering the power waveform with one or more low pass filters to smooth the power waveform to create a smoothed power waveform.

3. The non-transitory machine readable medium as in claim 2, wherein the method further comprises: quantizing values in the power waveform to discretize power values in the power waveform into quantized bins.

4. The non-transitory machine readable medium as in claim 1, wherein the method further comprises:
identifying a set of one or more steady state portions of the power waveform;
identifying a set of one or more transient portions of the power waveform.

5. The non-transitory machine readable medium as in claim 4, wherein the method further comprises one or both of:
determining, within each of the steady state portions, a number of instances of each unique pattern and wherein the power consumed in the IC is computed based on a weighted sum of the number of instances in the steady state portions; and
determining, within each of the transient portions, a number of instances of each unique pattern and wherein the power consumed in the IC is computed based on a weighted sum of the number of instances in the transient portions.

6. The non-transitory machine readable medium as in claim 1, wherein the one or more patterns are recognized within assigned time periods based on algorithms that use one or more inputs comprising: one or more statistical values, a number of peaks within a time period, a number of troughs in the time period, locations within the time period of the peaks and troughs, durations of the peaks and troughs, and magnitudes of peaks and troughs.

7. The non-transitory machine readable medium as in claim 1, wherein the power consumed for each unique pattern is computed with more accuracy than the estimation.

8. The non-transitory machine readable medium as in claim 7, wherein the power waveform is estimated from a toggle simulation data of populated nets in a netlist and a load capacitance of each of the populated nets.

9. A machine implemented method for performing an analysis of a circuit, the method comprising:
generating a representation of a power waveform that is an estimation of power consumption by a design of an integrated circuit (IC) over a period of time, the estimation based on switching activities in the design of the IC over the period of time;
recognizing one or more patterns in the representation of the power waveform, each of the one or more patterns being a unique pattern;
computing power consumed for each unique pattern to derive a set of pattern based power consumptions;
computing power consumed in the design of the IC based on a weighted sum of the set of pattern based power consumptions;
receiving a revised design of the IC to reduce power consumption in response to the computed power consumed exceeding a desired goal;
providing data about the revised design of the IC to a manufacturing facility to fabricate the IC.

10. The method as in claim 9, wherein the method further comprises: filtering the power waveform with one or more low pass filters to smooth the power waveform to create a smoothed power waveform.

11. The method as in claim 10, wherein the method further comprises:
quantizing values in the power waveform to discretize power values in the power waveform into quantized bins.

12. The method as in claim 9, wherein the method further comprises:
identifying a set of one or more steady state portions of the power waveform;
identifying a set of one or more transient portions of the power waveform.

13. The method as in claim 12, wherein the method further comprises one or both of:
determining, within each of the steady state portions, a number of instances of each unique pattern and wherein the power consumed in the IC is computed based on a weighted sum of the number of instances in the steady state portions; and
determining, within each of the transient portions, a number of instances of each unique pattern and wherein the power consumed in the IC is computed based on a weighted sum of the number of instances in the transient portions.

14. The method as in claim 9, wherein the one or more patterns are recognized within assigned time periods based on algorithms that use one or more inputs comprising: one or more statistical values, a number of peaks within a time period, a number of troughs in the time period, locations within the time period of the peaks and troughs, durations of the peaks and troughs and magnitudes of peaks and troughs.

15. The method as in claim 9, wherein the power consumed for each unique pattern is computed with more accuracy than the estimation.

16. The method as in claim 15, wherein the power waveform is estimated from a toggle simulation data of populated nets in a netlist and a load capacitance of each of the populated nets.

* * * * *